(12) United States Patent
Mori

(10) Patent No.: US 10,527,825 B2
(45) Date of Patent: Jan. 7, 2020

(54) IMAGE PICKUP OPTICAL SYSTEM AND IMAGE PICKUP APPARATUS HAVING THE SAME

(71) Applicant: CANON KABUSHIKI KAISHA, Tokyo (JP)

(72) Inventor: Kentaro Mori, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 68 days.

(21) Appl. No.: 15/817,929

(22) Filed: Nov. 20, 2017

(65) Prior Publication Data
US 2018/0143409 A1 May 24, 2018

(30) Foreign Application Priority Data

Nov. 21, 2016 (JP) .................................. 2016-225810
Oct. 10, 2017 (JP) .................................. 2017-196646

(51) Int. Cl.
G02B 13/02 (2006.01)
G02B 27/42 (2006.01)
G02B 9/64 (2006.01)
G02B 13/18 (2006.01)
G02B 7/04 (2006.01)
G02B 7/02 (2006.01)

(52) U.S. Cl.
CPC ............... *G02B 13/02* (2013.01); *G02B 9/64* (2013.01); *G02B 27/4211* (2013.01); *G02B 7/021* (2013.01); *G02B 7/04* (2013.01); *G02B 13/18* (2013.01)

(58) Field of Classification Search
CPC .... G02B 13/02; G02B 27/4211; G02B 13/18; G02B 7/021; G02B 7/04; G02B 9/12; G02B 9/14; G02B 9/24; G02B 9/26; G02B 9/28; G02B 9/60; G02B 9/62; G02B 9/64; G02B 13/01
See application file for complete search history.

(56) References Cited

U.S. PATENT DOCUMENTS

| 2011/0310486 A1 | 12/2011 | Eguchi |
| 2012/0092779 A1 | 4/2012 | Maetaki |
| 2012/0229921 A1 | 9/2012 | Eguchi |
| 2013/0021513 A1* | 1/2013 | Eguchi ..................... G02B 9/12 348/335 |

(Continued)

FOREIGN PATENT DOCUMENTS

| JP | 2012-88427 A | 5/2012 |
| JP | 2012-242742 A | 12/2012 |
| JP | 2014-56195 A | 3/2014 |

Primary Examiner — Kimberly N. Kakalec
(74) Attorney, Agent, or Firm — Carter, DeLuca & Farrell LLP

(57) ABSTRACT

An image pickup optical system of the present invention includes, in order from the object side to the image side, a first lens unit having a positive refractive power, a second lens unit having a negative refractive power, an aperture stop, and a third lens unit, and the second lens unit moves during focusing. The first lens unit consists of, in order from the object side to the image side, a first lens sub-unit having a positive refractive power, a second lens sub-unit having a negative refractive power, and a third lens sub-unit having a positive refractive power, and the focal length of the second lens sub-unit and the focal length of the image pickup optical system are appropriately set.

16 Claims, 4 Drawing Sheets

(56) References Cited

U.S. PATENT DOCUMENTS

2013/0194487 A1* 8/2013 Eguchi .................. G02B 13/02
       348/360
2016/0349482 A1  12/2016 Yokoyama et al.

* cited by examiner

IMAGE PICKUP OPTICAL SYSTEM AND IMAGE PICKUP APPARATUS HAVING THE SAME

BACKGROUND OF THE INVENTION

Field of the Invention

The present invention relates to an image pickup optical system, and is particularly advantageous when applied to an image pickup apparatus such as, for example, a digital still camera, a digital video camera, a surveillance camera, a television camera, or a silver-halide film camera.

Description of the Related Art

As an image pickup optical system with a long focal length, there has conventionally been known what is called a telephoto-type image pickup optical system (a telephoto lens) including, in order from the object side to the image side, a front lens unit having a positive refractive power and a rear lens unit having a negative refractive power.

Also, as a method for reducing the weight of a lens while favorably correcting various aberrations of an image pickup optical system including chromatic aberration, there has been known a method that uses a diffractive optical unit producing the effect of diffraction, as part of the image pickup optical system. There is known an image pickup optical system achieving reduction in overall size and weight by using the effect of diffraction such that the front lens unit needs only a smaller number of lenses for correction of aberrations than before, and can be formed from a glass material having a higher refractive index than a low-dispersion material, such as fluorite, having anomalous partial dispersion (U.S. Patent Application Publication No. 2012/0092779 and Japanese Patent Application Laid-Open No. 2014-56195).

U.S. Patent Application Publication No. 2012/0092779 discloses a telephoto lens with a focal length of approximately 600 mm, which is provided with a diffractive optical unit (a diffraction surface) in its front lens unit having a positive refractive power. Japanese Patent Application Laid-Open No. 2014-56195 discloses a telephoto lens with a focal length of approximately 400 mm, which is provided with a diffractive optical unit in its front lens unit having a positive refractive power and achieves weight reduction by having appropriate settings for the specific gravities of materials for lenses included the front lens unit.

SUMMARY OF THE INVENTION

The present invention aims to provide an image pickup optical system that easily offers high optical performance while achieving reduction in its overall size and weight.

The image pickup optical system according to the present invention comprises, in order from an object side to an image side, a first lens unit having a positive refractive power, a second lens unit having a negative refractive power, an aperture stop, and a third lens unit, in which the second lens unit moves during focusing. The first lens unit consists of, in order from the object side to the image side, a first lens sub-unit having a positive refractive power, a second lens sub-unit having a negative refractive power, and a third lens sub-unit having a positive refractive power. In the image pickup optical system according to the present invention, the following conditional expression is satisfied:

$$-0.65 < f1b/f < -0.05$$

where f1b is a focal length of the second lens sub-unit, and f is a focal length of the image pickup optical system.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings. An image pickup optical system of the present invention includes, in order from the object side to the image side, a first lens unit having a positive refractive power, a second lens unit having a negative refractive power, an aperture stop, and a third lens unit. The second lens unit moves during focusing.

Figure 1:
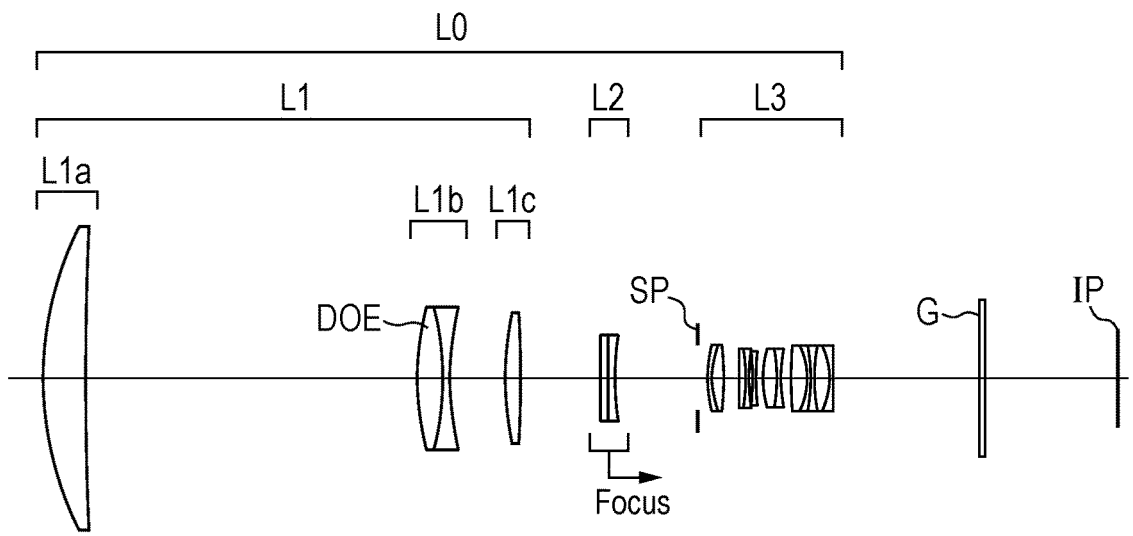
FIG. 1 is a lens sectional diagram of an image pickup optical system of Embodiment 1.
Figure 2:
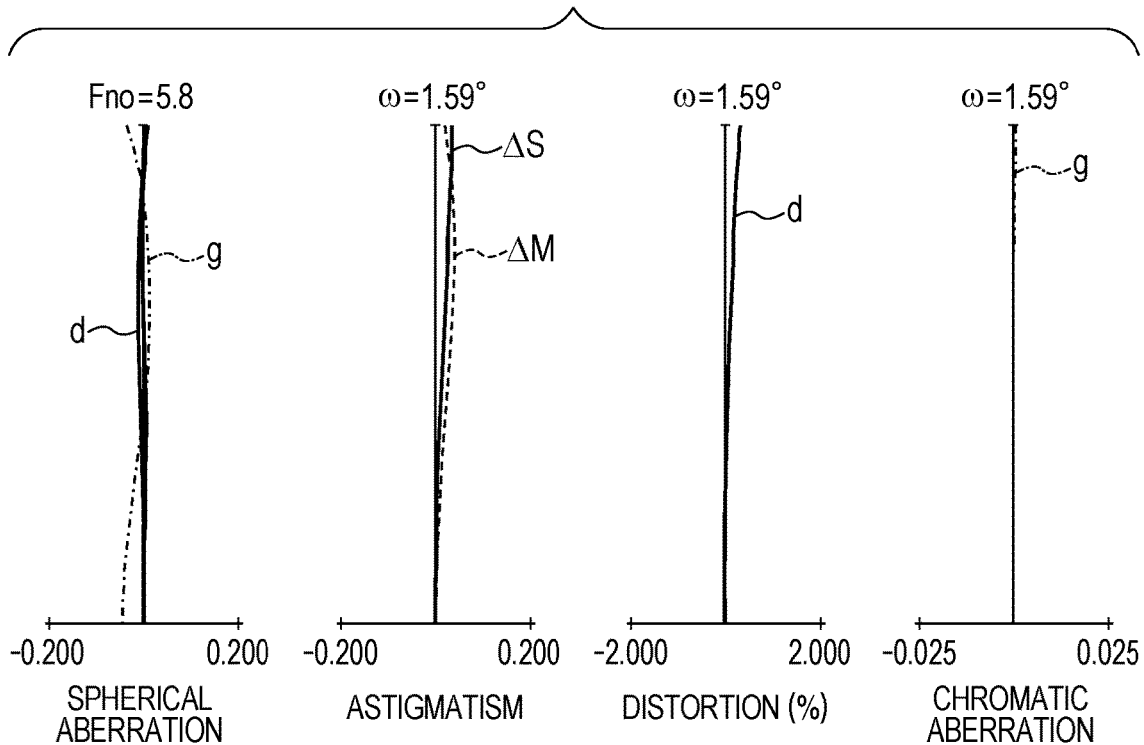
FIG. 2 is an aberration diagram of an image pickup optical system of Embodiment 1 when the object distance is infinity.
Figure 3:
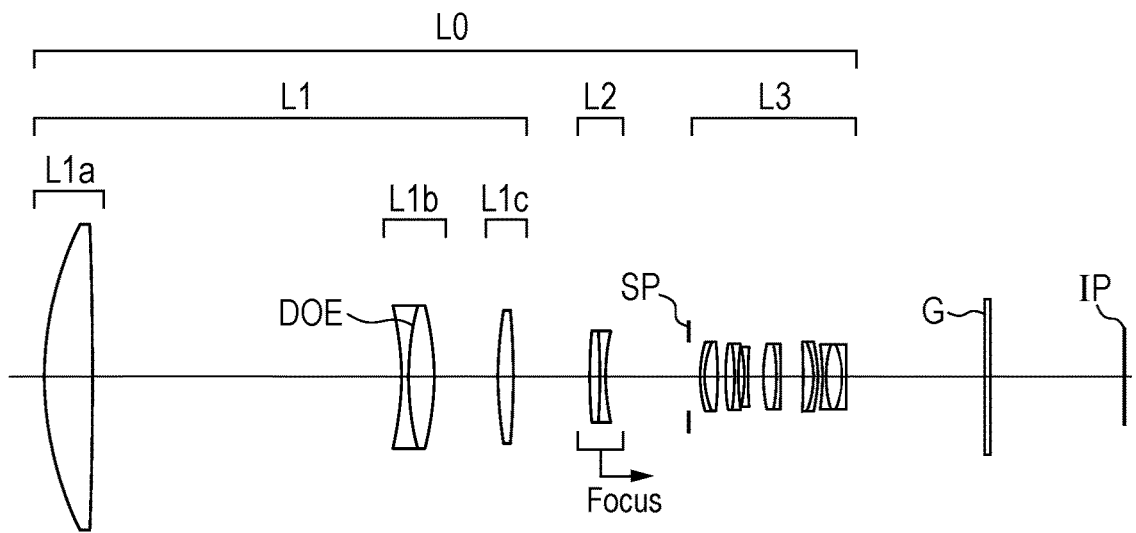
FIG. 3 is a lens sectional diagram of an image pickup optical system of Embodiment 2.
Figure 4:
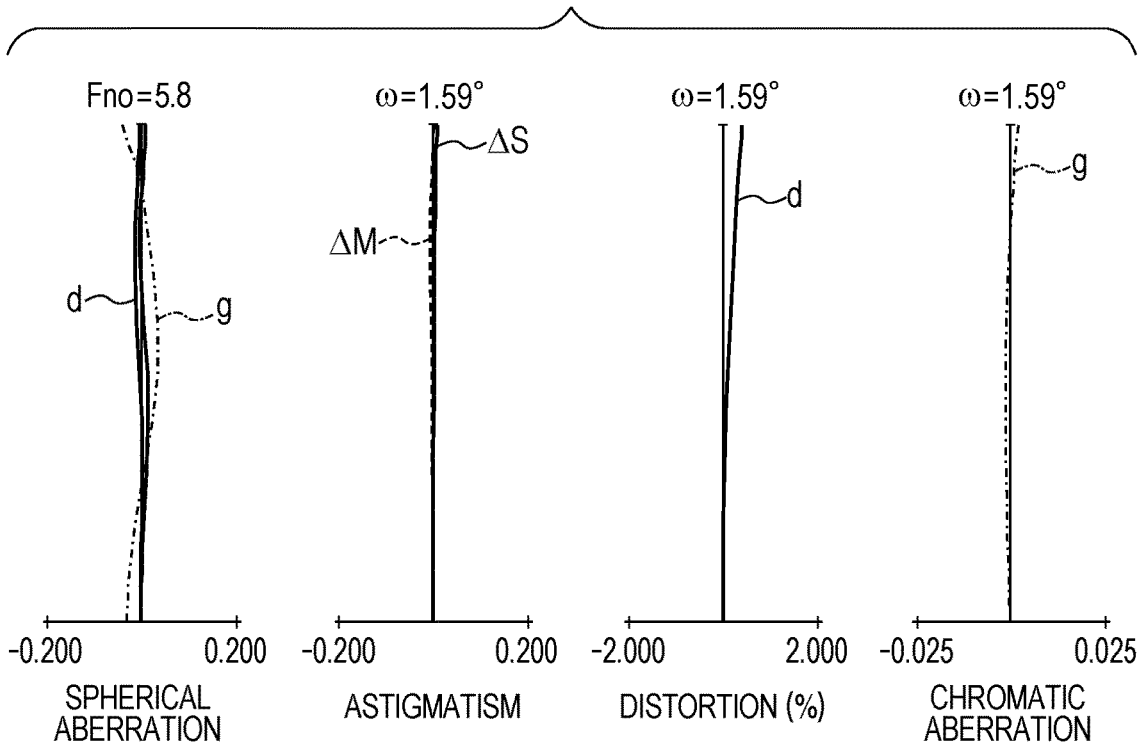
FIG. 4 is an aberration diagram of an image pickup optical system of Embodiment 2 when the object distance is infinity.

FIG. 1 is a lens sectional diagram of an image pickup optical system of Embodiment 1 of the present invention. FIG. 2 is a longitudinal aberration diagram of the image pickup optical system of Embodiment 1 of the present invention. The image pickup optical system of Embodiment 1 has an f-number of 5.80 and an angle of view of 3.18°. FIG. 3 is a lens sectional diagram of an image pickup optical system of Embodiment 2 of the present invention. FIG. 4 is a longitudinal aberration diagram of the image pickup optical system of Embodiment 2 of the present invention. The image pickup optical system of Embodiment 2 has an f-number of 5.80 and an angle of view of 3.18°.

Figure 5:
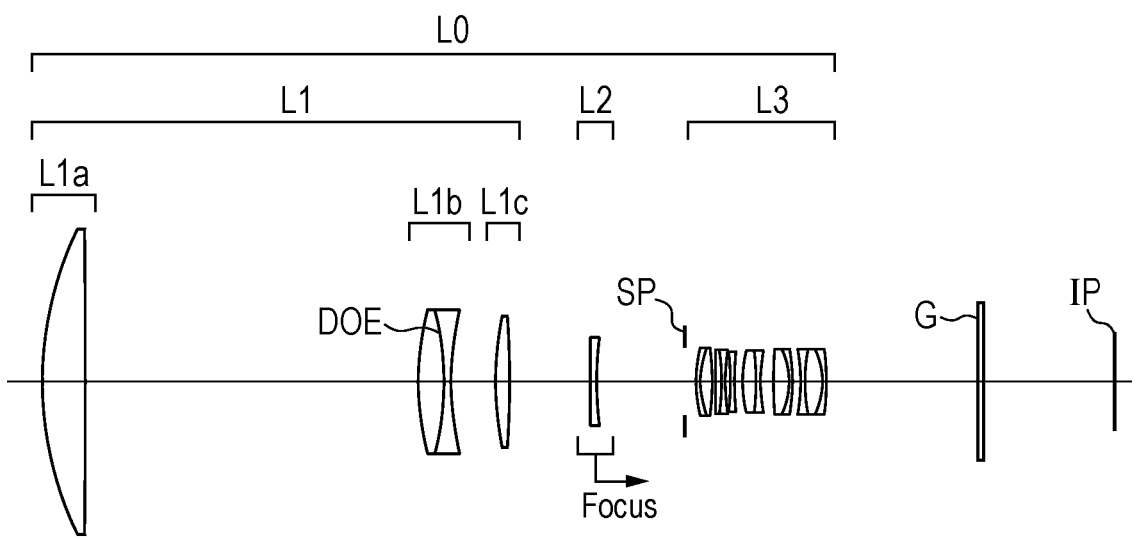
FIG. 5 is a lens sectional diagram of an image pickup optical system of Embodiment 3.
Figure 6:
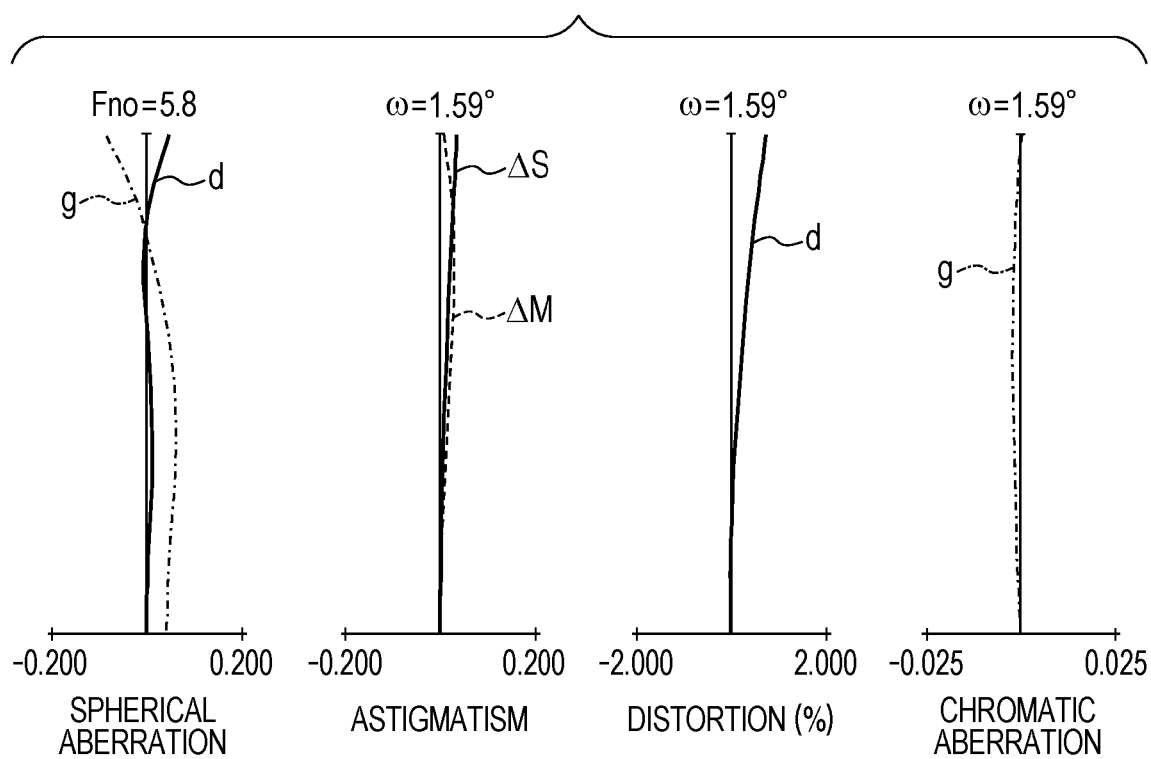
FIG. 6 is an aberration diagram of an image pickup optical system of Embodiment 3 when the object distance is infinity.
Figure 7:
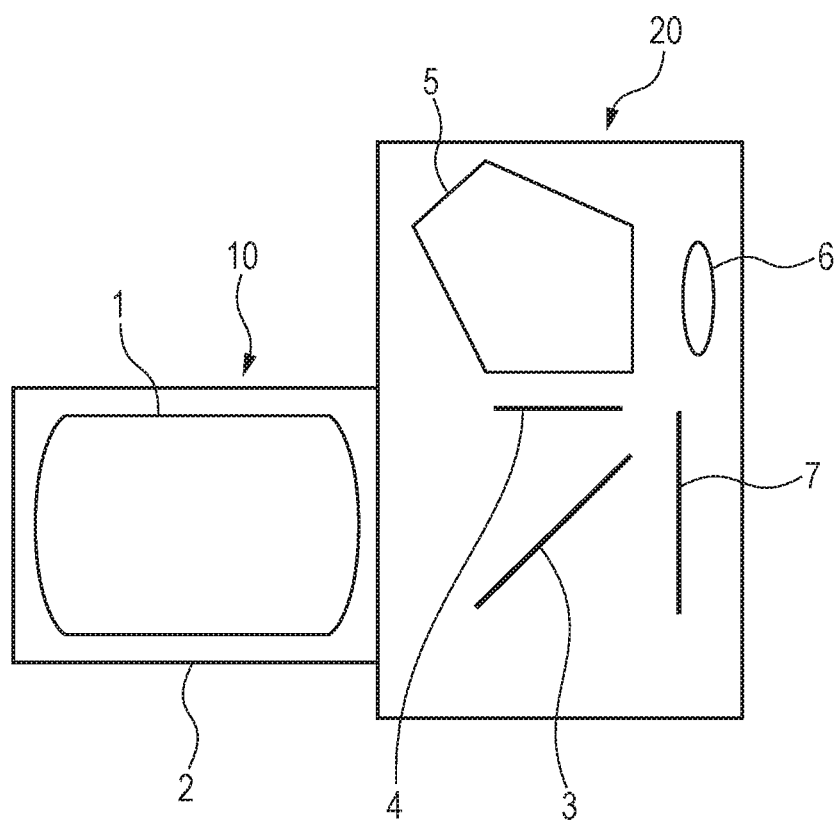
FIG. 7 is a diagram schematically illustrating the main part of an image pickup apparatus of the present invention.

FIG. 5 is a lens sectional diagram of an image pickup optical system of Embodiment 3 of the present invention. FIG. 6 is a longitudinal aberration diagram of the image pickup optical system of Embodiment 3 of the present invention. The image pickup optical system of Embodiment 3 has an f-number of 5.80 and an angle of view of 3.18°. FIG. 7 is a diagram schematically illustrating the main part of an image pickup apparatus of the present invention.

In the lens sectional diagrams, the left side is the object side, and the right side is the image side. "L0" denotes the image pickup optical system, "L1" denotes the first lens unit having a positive refractive power, "L2" denotes the second lens unit having a negative refractive power, and "L3" denotes the third lens unit. "L1a" denotes a first lens sub-unit having a positive refractive power, "L1b" denotes a second lens sub-unit having a negative refractive power, and "L1c" denotes a third lens sub-unit having a positive refractive power. A lens sub-unit herein means a lens unit formed by a single lens or a cemented lens formed by a plurality of lenses cemented together.

"DOE" denotes a diffractive optical unit (a diffraction surface), and "SP" denotes an aperture stop. "IP" denotes an image plane corresponding to the image pickup plane of a solid-state image pickup element (a photo-electric conversion element) such as a CCD or CMOS sensor. Further, "G" denotes a parallel plate such as a low-pass filter, which is disposed in front of the image pickup plane as necessary.

In the spherical aberration diagram, "Fno" denotes an f-number. Further, the solid line "d" denotes the d-line (wavelength 587.6 nm) and the one-dot dash line "g" denotes the g-line (wavelength 435.8 nm). In the astigmatism diagram, the dot line "ΔM" denotes the meridional image plane of the d-line, and the solid line "ΔS" denotes the sagittal image plane of the d-line. The distortion diagram is represented by the d-line. The lateral chromatic aberration diagram is represented by the g-line. Further, "ω" denotes a half angle of view (°).

A description is given below of the lens configuration of the image pickup optical system L0 of the present invention that is light in weight and easily offers high image quality.

The image pickup optical system L0 of the present invention has what is called a telephoto-type lens configuration, and includes, in order from the object side to the image side, a first lens unit L1 having a positive refractive power, a second lens unit L2 having a negative refractive power, an aperture stop SP, and a third lens unit L3 having a positive or negative refractive power. Thus configured, the image pickup optical system L0 offers favorable optical performance while achieving reduction in its total lens length. The first lens unit L1 includes, in order from the object side to the image side, a first lens sub-unit L1a having a positive refractive power, a second lens sub-unit L1b having a negative refractive power, and a third lens sub-unit L1c having a positive refractive power.

To reduce the weight of the image pickup optical system L0, it is important to reduce the number of lenses in the lens unit on the object side and to reduce the effective diameter thereof. The first lens sub-unit L1a, which is disposed closest to the object side, includes a single positive lens.

In general, the effective diameter of the front lens of a telephoto-type image pickup optical system is determined by its f-number, and is the effective diameter of a lens having the largest effective diameter in the image pickup optical system. To reduce the weight of the image pickup optical system, it is important to reduce the number of lenses having a large effective diameter, and the above configuration is effective in reducing the weight of the image pickup optical system. When the first lens sub-unit L1a includes a single positive lens, however, chromatic aberration likely occurs. For this reason, the second lens sub-unit L1b has a negative refractive power to effectively correct the chromatic aberration caused by the first lens sub-unit L1a.

The third lens sub-unit L1c has a positive refractive power. Since the second lens sub-unit L1b has a negative refractive power, convergence of axial rays is necessary to reduce the diameter and weight of the second lens unit L2. This configuration is effective in reducing the weight of the image pickup optical system.

The image pickup optical system of the present invention satisfies the following conditional expression:

$$-0.65 < f1b/f < -0.05 \quad (1)$$

where f1b is the focal length of the second lens sub-unit L1b, and f is the focal length of the image pickup optical system.

An image pickup optical system satisfying Conditional Expression (1) achieves high image quality with a light overall weight. If the value of Conditional Expression (1) exceeds its upper limit value because the negative focal length of the second lens sub-unit L1b is too short (or too small in absolute value), aberrations such as spherical aberration and chromatic aberration increase to such a degree that it is difficult to obtain high image quality. If the value of Conditional Expression (1) falls below its lower limit value because the negative focal length of the second lens sub-unit L1b is too long (or too large in absolute value), the effective diameter of the second lens sub-unit L1b increases, making it difficult to reduce the weight of the image pickup optical system.

The image pickup optical system of each embodiment having the above configuration easily offers high image quality with a light overall weight. Preferably, in each embodiment, the numerical values in Conditional Expression (1) are set as follows:

$$-0.45 < f1b/f < -0.13. \quad (1a)$$

More preferably, the numerical values in Conditional Expression (1a) are set as follows:

$$-0.34 < f1b/f < -0.17. \quad (1b)$$

Still more preferably, the image pickup optical system of each embodiment satisfies at least one of the following conditional expressions:

$$0.43 < d1a/f1a < 0.80, \quad (2)$$

$$0.07 < d1b/|f1b| < 0.35, \quad (3)$$

$$0.12 < d1c/f1c < 0.45, \quad (4)$$

$$10.4 < f/ea1b < 16.0, \text{ and} \quad (5)$$

$$17.0 < f/ea2 < 24.0 \quad (6)$$

where d1a is the distance between the first lens sub-unit L1a and the second lens sub-unit L1b, f1a is the focal length of the first lens sub-unit L1a, d1b is the distance between the second lens sub-unit L1b and the third lens sub-unit L1c, d1c is the distance between the third lens sub-unit L1c and the second lens unit L2 at infinity focus, f1c is the focal length of the third lens sub-unit L1c, ea1b is the effective diameter of a lens surface closest to the object side in the second lens sub-unit L1b, and ea2 is the effective diameter of a lens surface closest to the object side in the second lens unit L2.

Next, the technical meanings of the above conditional expressions are described. An image pickup optical system satisfying Conditional Expression (2) offers high image quality while achieving a light overall weight. If the value of Conditional Expression (2) exceeds its upper limit value because the distance d1a is too long, the incident height of axial rays incident on the second lens sub-unit L1b is so low relative to the optical axis as to make it difficult to correct aberrations such as spherical aberration. If the value of Conditional Expression (2) falls below its lower limit value because the distance d1a is too short, it is difficult to reduce the diameter of the lens located on the object side, which makes it difficult to reduce the weight of the image pickup optical system.

An image pickup optical system satisfying Conditional Expression (3) offers high image quality. If the value of Conditional Expression (3) exceeds its upper limit value because the distance d1b is too long, the total lens length (the length from the first lens surface to the image plane) becomes too long, and this is not favorable. If the value of Conditional Expression (3) falls below its lower limit value because the distance d1b is too short, it is difficult to fully utilize the off-axial ray convergence effect provided by the second lens sub-unit L1b, and an unbalanced aperture becomes noticeable. An unbalanced aperture refers to a state where the principal ray of off-axial meridional rays does not coincide with the center position between the upper ray and the lower ray of the off-axial meridional rays. When an unbalanced aperture occurs, an increase in an f-number noticeably reduces the quantity of light outside the screen, and this is not favorable in terms of image quality.

An image pickup optical system satisfying Conditional Expression (4) achieves a light overall weight. If the value of Conditional Expression (4) exceeds its upper limit value because the distance d1c is too long, the total lens length becomes too long, and this is unfavorable. If the value of Conditional Expression (4) falls below its lower limit value because the distance d1c is too short, it is difficult to reduce the diameter of the second lens unit L2, which in turn makes it difficult to reduce the weight of the image pickup optical system.

An image pickup optical system satisfying Conditional Expression (5) offers high image quality with a light overall weight. If the value of Conditional Expression (5) exceeds its upper limit value because the effective diameter of the lens surface closest to the object side in the second lens sub-unit L1b is too small, the second lens sub-unit L1b is less effective in correcting aberrations such as chromatic aberration, spherical aberration and coma, making it difficult to offer high image quality. If the value of Conditional Expression (5) falls below its lower limit value because the effective diameter of the lens surface closest to the object side in the second lens sub-unit L1b is too large, it is difficult to reduce the weight of the image pickup optical system.

An image pickup optical system satisfying Conditional Expression (6) offers high image quality with a light overall weight. If the value of Conditional Expression (6) exceeds its upper limit value because the effective diameter of the lens surface closest to the object side in the second lens unit L2 is too small, the second lens unit L2 is less effective in correcting aberrations such as chromatic aberration and spherical aberration, making it difficult to offer high image quality. If the value of Conditional Expression (6) falls below its lower limit value because the effective diameter of the lens surface closest to the object side in the second lens unit L2 is too large, it is difficult to reduce the weight of the image pickup optical system.

Preferably, the numerical values in Conditional Expressions (2) to (6) are set as follows:

$$0.45 < d1a/f1a < 0.65, \quad (2a)$$

$$0.09 < d1b/|f1b| < 0.28, \quad (3a)$$

$$0.17 < d1c/f1c < 0.37, \quad (4a)$$

$$11.3 < f/ea1b < 15.0, \text{ and} \quad (5a)$$

$$17.5 < f/ea2 < 22.5. \quad (6a)$$

More preferably, the numerical values in Conditional Expressions (2a) to (6a) are set as follows:

$$0.46 < d1a/f1a < 0.55, \quad (2b)$$

$$0.11 < d1b/|f1b| < 0.20, \quad (3b)$$

$$0.19 < d1c/f1c < 0.30, \quad (4b)$$

$$12.0 < f/ea1b < 14.0, \text{ and} \quad (5b)$$

$$18.5 < f/ea2 < 21.0. \quad (6b)$$

Moreover, it is preferable in each embodiment that the second lens sub-unit L1b have a diffractive optical unit (a diffraction surface) DOE at the cemented surface thereof.

Setting the diffractive optical unit in the second lens sub-unit L1b facilitates favorable correction for chromatic aberration, making it easy to offer high image quality. It is also preferable in each embodiment that the lens surface closest to the image side in the first lens sub-unit L1a be aspheric. Setting an aspheric surface in the first lens sub-unit L1a facilitates favorable correction for spherical aberration and coma, making it easy to offer high image quality.

It is also preferable in each embodiment that the second lens sub-unit L1b consist of a positive lens and a negative lens. Forming the second lens sub-unit L1b with two lenses facilitates weight reduction of the image pickup optical system. It is also preferable that the second lens unit L2 in each embodiment move from the object side to the image side during focusing from infinity to a close distance. This allows the effective diameter of the aperture stop SP to be small, facilitating weight reduction of the optical system.

It is also preferable in each embodiment that the cemented surface of the second lens sub-unit L1b be provided with the diffractive optical unit DOE and that the image pickup optical system satisfy the following conditional expression:

$$5.00 < fC2/f < 16.50 \quad (7)$$

where fC2 is the focal length of the diffractive optical unit DOE at the reference wavelength (d-line) of first-order diffraction light.

The focal length fC2 is the focal length achieved by light condensing effect provided by the diffraction of the diffractive optical unit DOE, and is expressed by the following equation using a phase coefficient C of an optical-path-difference function:

$$fC2 = -1/(2 \times C2).$$

An image pickup optical system satisfying Conditional Expression (7) offers high image quality. If the value of Conditional Expression (7) exceeds its upper limit value because the focal length fC2 is too long, chromatic aberration cannot be easily corrected. If the value of Conditional Expression (7) falls below its lower limit value because the focal length fC2 is too short, many diffraction flares tend to occur, and this is unfavorable.

Preferably, the numerical values in Conditional Expression (7) are set as follows:

$$7.00 < fC2/f < 14.00. \quad (7a)$$

More preferably, the numerical values in Conditional Expression (7a) are set as follows:

$$9.00 < fC2/f < 12.00. \quad (7b)$$

It is further preferable that the optical system of each embodiment satisfy at least one of the following Conditional Expressions (8) and (9).

$$0.20 < f1a/f < 0.60, \text{ and} \quad (8)$$

$$0.10 < f1c/f < 0.30. \quad (9)$$

Conditional Expression (8) concerns the focal length of the first lens sub-unit L1a. If the value of Conditional Expression (8) falls below its lower limit value because the focal length f1a is too short, it is difficult for a lens disposed on the image side of the first lens sub-unit L1a to sufficiently correct aberrations caused by the first lens sub-unit L1a. If, by contrast, the value of Conditional Expression (8) exceeds its upper limit value because the focal length f1a is too long, it is difficult to sufficiently reduce the diameter of the second lens sub-unit L1b.

Conditional Expression (9) concerns the focal length of the third lens sub-unit L1c. If the value of Conditional Expression (9) falls below its lower limit value because the focal length f1c is too short, aberrations such as spherical aberration and chromatic aberration increase. If, by contrast, the value of Conditional Expression (9) exceeds its upper limit value because the focal length f1c is too long, it is difficult to sufficiently reduce the diameter of the second lens unit L2.

Preferably, the numerical values in Conditional Expressions (8) and (9) are set as follows:

$$0.27 < f1a/f < 0.50, \text{ and} \quad (8a)$$

$$0.13 < f1c/f < 0.30. \quad (9a)$$

More preferably, the numerical values in Conditional Expressions (8a) and (9a) are set as follows:

$$0.32 < f1a/f < 0.45, \text{ and} \quad (8b)$$

$$0.15 < f1c/f < 0.25. \quad (9b)$$

It is further preferable that the second lens sub-unit L1b include a negative biconcave lens. This configuration enables the second lens sub-unit L1b to be small with an appropriate focal length.

Further, in this case, the negative biconcave lens included in the second lens sub-unit L1b preferably satisfies the following Conditional Expression (10):

$$-0.20 < (ra+rb)/(ra-rb) < 0.20 \quad (10)$$

where ra is the curvature radius of the object-side lens surface of the negative biconcave lens included in the second lens sub-unit L1b, and rb is the curvature radius of the image-side lens surface of the negative biconcave lens included in the second lens sub-unit L1b.

Conditional Expression (10) concerns the shape factor of the negative biconcave lens included in the second lens sub-unit L1b. If the value of Conditional Expression (10) exceeds its upper limit value or falls below its lower limit value, it is difficult to enable the second lens sub-unit L1b to be small with an appropriate focal length.

Preferably, the numerical values in Conditional Expression (10) are set as follows:

$$-0.15 < (ra+rb)/(ra-rb) < 0.15. \quad (10a)$$

More Preferably, the numerical values in Conditional Expression (10a) are set as follows:

$$-0.12 < (ra+rb)/(ra-rb) < 0.12. \quad (10b)$$

In each embodiment, any lens, lens sub-unit, or sensor may be moved in a direction having a component perpendicular to the optical axis to correct image blurring. Further, distortion may be corrected electrically using any of various known techniques.

Next, a description is given of the lens configurations of the lens units in each embodiment.

Embodiment 1

The image pickup optical system of Embodiment 1 has a focal length of 780.00 mm and an f-number of approximately 5.80. The first lens unit L1 includes, in order from the object side to the image side, the first lens sub-unit L1a having a positive refractive power, the second lens sub-unit L1b having a negative refractive power, and the third lens sub-unit L1c having a positive refractive power.

The first lens sub-unit L1a includes a positive biconvex lens being aspheric on its image-side lens surface. This aspheric surface favorably corrects aberrations such as spherical aberration. The second lens sub-unit L1b includes a cemented lens of a positive biconvex lens and a negative biconcave lens cemented to each other. The cemented surface of the cemented lens is a diffractive optical unit (a diffraction surface). This enables favorable correction of chromatic aberration.

The third lens sub-unit L1c includes a positive biconvex lens. This enables reduction in the diameters of the second lens unit L2 and the third lens unit L3 to be described next. The second lens unit L2 having a negative refractive power includes a cemented lens of a positive biconvex lens and a negative biconcave lens cemented to each other. The second lens unit L2 moves from the object side to the image side during focusing from infinity to a close distance.

The third lens unit L3 includes a cemented lens in which a negative meniscus lens having a convex surface facing to the object side and a positive biconvex lens are cemented to each other, a cemented lens of a positive biconvex lens and a negative biconcave lens cemented to each other, and a negative biconcave lens.

The third lens unit L3 further includes a cemented lens of a positive biconvex lens and a negative biconcave lens cemented to each other, a cemented lens in which a positive biconvex lens and a negative meniscus lens having a convex surface facing to the image side are cemented to each other, and a negative biconcave lens. The third lens unit L3 further includes a cemented lens in which a positive biconvex lens and a negative meniscus lens having a convex surface facing to the image side are cemented to each other. This configuration enables favorable correction of field curvature, lateral chromatic aberration, and the like.

Embodiment 2

The image pickup optical system of Embodiment 2 has a focal length of 780.00 mm and an f-number of approximately 5.80. The first lens unit L1 includes, in order from the object side to the image side, the first lens sub-unit L1a having a positive refractive power, the second lens sub-unit L1b having a negative refractive power, and the third lens sub-unit L1c having a positive refractive power.

The first lens sub-unit L1a includes a positive biconvex lens being aspheric on its image-side lens surface. This aspheric surface favorably corrects aberrations such as spherical aberration. The second lens sub-unit L1b includes a cemented lens of a negative biconcave lens and a positive biconvex lens cemented to each other. The cemented surface of the cemented lens is a diffractive optical unit (a diffraction surface). This enables favorable correction of chromatic aberration.

The third lens sub-unit L1c includes a positive biconvex lens. This enables reduction in the diameters of the second lens unit L2 and the third lens unit L3 to be described next. The second lens unit L2 has the same lens configuration as that of Embodiment 1. The third lens unit L3 includes a cemented lens in which a negative meniscus lens having a convex surface facing to the object side and a positive biconvex lens are cemented to each other, a cemented lens of a positive biconvex lens and a negative biconcave lens cemented to each other, and a negative biconcave lens.

The third lens unit L3 further includes a cemented lens in which a positive biconvex lens and a negative meniscus lens having a convex surface facing to the image side are cemented to each other, a cemented lens in which a positive meniscus lens having a convex surface facing to the image side and a negative meniscus lens having a convex surface facing to the image side are cemented to each other, and a negative biconcave lens. The third lens unit L3 further includes a cemented lens of a positive biconvex lens and a negative biconcave lens cemented to each other. This configuration enables favorable correction of field curvature, lateral chromatic aberration, and the like.

Embodiment 3

The image pickup optical system of Embodiment 3 has a focal length of 780.00 mm and an f-number of approximately 5.80. The first lens unit L1 has the same lens configuration as that of Embodiment 1. The second lens unit L2 having a negative refractive power includes a negative biconcave lens, and moves from the object side to the image side during focusing from infinity to a close distance. The third lens unit L3 has the same lens configuration as that of Embodiment 1.

Next, a description is given of an embodiment of an image pickup apparatus (a camera system) to which the image pickup optical system of the present invention is applied. FIG. 7 is a diagram schematically illustrating the main part of a single-lens reflex camera. In FIG. 7, "10" denotes an image pickup lens having any one of image pickup optical systems 1 of Embodiments 1 to 3. The image pickup optical system 1 is held by a lens barrel 2 serving as a holding member. Further, "20" denotes a camera main body. The camera main body 20 has a quick return mirror 3 that reflects rays from the image pickup lens 10 upward, a focusing screen 4 disposed at the position where the image pickup lens 10 forms an image, a penta dach prism 5 that converts an inverse image formed on the focusing screen 4 into an erect image, an eyepiece 6 used to observe the erect image, and the like.

Further, "7" denotes a photosensitive surface, where an image pickup element (a photo-electric conversion element), such as a CCD or CMOS sensor, or a silver-halide film is placed. To capture an image, the quick return mirror 3 retreats from the optical path, and an image is formed on the photosensitive surface 7 by the image pickup lens 10. The image pickup element 7 receives light of the image formed by the image pickup optical system 1.

The image pickup apparatus of the present invention is applicable likewise to a mirrorless single-lens reflex camera, which has no quick return mirror 3.

As the grating shape of the diffractive optical unit DOE in each embodiment, a phase $\varphi(H)$ at a distance H from the optical axis is expressed by the following expression with $C_{2i}$ being the phase coefficient for the 2i-th order term:

$$\phi(H) = \left(2\pi \frac{m}{\lambda_0}\right) \cdot (C_2 \cdot H^2 + C_4 \cdot H^4 + C_6 \cdot H^6 \ldots + C_{2i} \cdot H^{2i}) \quad (a)$$

where m is the order of diffraction, and $\lambda_0$ is a reference wavelength.

In general, an Abbe number (a dispersion value) $v_d$ of a refractive optical material, such as a lens or a prism, is expressed by the following expression:

$$v_d = (N_d - 1)/(N_F - N_C) > 0 \quad (b)$$

where $N_d$, $N_C$, and $N_F$ are the refractive indices of the material at the wavelengths of the d-line, the C-line, and the F-line, respectively. On the other hand, the Abbe number $v_d$ of a diffractive optical unit is expressed as $$v_d = \lambda_d/(\lambda_F - \lambda_C) \quad (c)$$

where $\lambda_d$, $\lambda_C$, and $\lambda_F$ are the wavelengths of the d-line, the C-line, and the F-line, respectively. Thus, $v_d = -3.45$.

Hence, the effect of dispersion at a given wavelength is opposite of that produced by a refractive optical element. Further, a refractive power $\varphi$ of the diffractive optical unit for paraxial first-order diffraction light (m=1) at the reference wavelength is expressed as $\varphi_D = -2 \times C_2$ where $C_2$ is the coefficient for the second-order term in the previously-given Expression (a) representing the phase of the diffractive optical unit. Further, variation in the refractive power at a given wavelength $\lambda$ with respect to a reference wavelength $\lambda_0$ is expressed by the following expression:

$$\varphi_D' = (\lambda/\lambda_0) \times (-2 \times C_2). \quad (d)$$

Thus, as a feature of the diffractive optical unit, by changing the phase coefficient $C_2$ in the previously-given expression (a), large dispersivity can be obtained with a small change in the paraxial refractive power. This means that chromatic aberration is corrected without causing a significant influence on aberrations other than chromatic aberration. With regard to the phase coefficients of orders higher than that of the phase coefficient $C_4$, the diffractive optical unit can produce a similar effect to an aspheric surface in terms of its changing the refractive power according to a change in the height of rays incident thereon.

At the same time, the refractive power at a given wavelength can be changed with respect to the reference wavelength according to a change in the light incident height. This is effective in correcting lateral chromatic aberration. It is also effective in correcting axial chromatic aberration to place the diffractive optical unit at the surface through which axial rays pass at a high position from the optical axis, as it is in the first lens unit L1 of the image pickup optical system of the present invention.

Next, Numerical Value Embodiments 1 to 3 corresponding respectively to Embodiments 1 to 3 of the present invention are presented. In each numerical value embodiment, "i" represents the ordinal number of a surface from the object side, "ri" represents the curvature radius of the i-th surface from the object side, "$d_i$" represents the distance between the i-th surface and the (i+1)-th surface from the object side, and $nd_i$ and $vd_i$ respectively represent the refractive index and the Abbe number of an optical member between the i-th surface and the (i+1)-th surface. In addition, each numerical value embodiment below shows the focal length of the image pickup optical system at infinity focus, an f-number, a half angle of view (°), an image height, a total lens length, and a back focal length.

The back focal length BF is the air-equivalent distance from the rearmost lens surface to the image plane. The total lens length is the total distance of the back focal length and the distance from the first lens surface to the last lens surface. The diffractive optical unit (diffraction surface) is represented with a phase coefficient of a phase function in Expression (a) previously given. With an X axis being the optical-axis direction, an H axis being perpendicular to the optical axis, a light travelling direction being positive, "R" representing the paraxial curvature radius, "k" representing an eccentricity, and "A4", "A6", "A8", "A10", and "A12" representing aspherical coefficients, an aspherical shape is expressed as follows:

$$X + \frac{\left(\frac{H^2}{R}\right)}{\left\{1 + \sqrt{1 - (1+K) \times \left(\frac{H}{R}\right)^2}\right\}} + A4 \times H^4 +$$

$$A6 \times H^6 + A8 \times H^8 + A10 \times H^{10} + A12 \times H^{12}$$

Further, for example, "e-z" indicates "$10^{-z}$". Table 1 shows correspondences between the above-given conditional expressions and Numerical Value Embodiments 1 to 3.

[Numerical Value Embodiment 1]

[unit: mm]

Surface data

| Surface number | r | d | nd | vd | Effective diameter |
|---|---|---|---|---|---|
| 1 | 155.316 | 19.75 | 1.48749 | 70.2 | 134.48 |
| 2* | −11936.522 | 149.66 | | | 133.10 |
| 3 | 141.692 | 11.62 | 1.43875 | 94.7 | 63.51 |
| 4(diffraction) | −129.418 | 2.95 | 1.85478 | 24.8 | 61.55 |
| 5 | 138.580 | 25.24 | | | 59.24 |
| 6 | 148.568 | 6.77 | 1.80810 | 22.8 | 57.68 |
| 7 | −430.938 | 36.30 | | | 57.05 |
| 8 | 376.152 | 3.64 | 1.80810 | 22.8 | 38.04 |
| 9 | −341.903 | 2.41 | 1.91082 | 35.3 | 37.19 |
| 10 | 81.473 | 37.49 | | | 35.74 |
| 11(stop) | ∞ | 5.00 | | | 30.10 |
| 12 | 59.113 | 1.51 | 1.95375 | 32.3 | 29.02 |
| 13 | 32.603 | 5.41 | 1.48749 | 70.2 | 28.08 |
| 14 | −132.255 | 7.19 | | | 27.87 |
| 15 | 144.910 | 2.87 | 1.85478 | 24.8 | 25.20 |
| 16 | −73.159 | 1.31 | 1.76385 | 48.5 | 24.89 |
| 17 | 60.985 | 1.97 | | | 23.89 |
| 18 | −103.864 | 1.26 | 1.76385 | 48.5 | 23.87 |
| 19 | 101.074 | 3.51 | | | 23.85 |
| 20 | 44.068 | 6.16 | 1.65412 | 39.7 | 24.93 |
| 21 | −221.182 | 1.26 | 1.59522 | 67.7 | 25.11 |
| 22 | 43.719 | 5.06 | | | 25.26 |
| 23 | 111.425 | 7.42 | 1.65412 | 39.7 | 27.09 |
| 24 | −32.515 | 1.36 | 1.43875 | 94.9 | 27.68 |
| 25 | −71.229 | 0.32 | | | 27.85 |
| 26 | −65.657 | 1.36 | 1.49700 | 81.5 | 27.83 |
| 27 | 91.771 | 0.10 | | | 28.15 |
| 28 | 70.818 | 6.82 | 1.65412 | 39.7 | 28.27 |
| 29 | −36.701 | 1.38 | 1.80810 | 22.8 | 28.28 |
| 30 | −1117.363 | 66.61 | | | 28.59 |
| 31 | ∞ | 2.20 | 1.51633 | 64.1 | 50.00 |
| 32 | ∞ | 60.71 | | | 50.00 |
| Image plane | ∞ | | | | |

Aspheric surface data

2nd surface

K = 0.00000e+000
A4 = 1.33317e−008
A6 = −2.16396e−013
A8 = 1.24478e−017
A10 = −7.29012e−022

4th surface (diffraction surface)

C2 = −6.17761e−005
C4 = 2.95632e−009
C6 = 1.29493e−012
C8 = −1.75952e−015
C10 = 5.04522e−019

Various data

| | |
|---|---|
| Focal length | 780.00 |
| F-number | 5.80 |
| Half angle of view (deg) | 1.59 |
| Image height | 21.64 |
| Total lens length | 485.85 |
| BF | 128.77 |
| Entrance pupil position | 1529.20 |
| Exit pupil position | −51.23 |
| Front principal point position | −1070.79 |
| Rear principal point position | −651.23 |

[unit: mm]

Lens unit data

| Unit | Start surface | Focal length | Lens structure length | Front principal point position | Rear principal point position |
|---|---|---|---|---|---|
| 1 | 1 | 272.27 | 215.99 | 154.27 | −159.51 |
| 2 | 8 | −108.04 | 6.05 | 4.02 | 0.72 |
| 3 | 12 | 1845.10 | 56.25 | 68.75 | 25.59 |
| 1a | 1 | 314.68 | 19.75 | 0.17 | −13.11 |
| 1b | 3 | −168.62 | 14.56 | 14.30 | 4.24 |
| 1c | 6 | 137.43 | 6.77 | 0.97 | −2.80 |

Single lens data

| Lens | Start surface | Focal length |
|---|---|---|
| 1 | 1 | 314.68 |
| 2 | 3 | 156.20 |
| 3 | 4 | −78.66 |
| 4 | 6 | 137.43 |
| 5 | 8 | 222.14 |
| 6 | 9 | −72.04 |
| 7 | 12 | −78.41 |
| 8 | 13 | 54.24 |
| 9 | 15 | 57.22 |
| 10 | 16 | −43.36 |
| 11 | 18 | −66.88 |
| 12 | 20 | 56.70 |
| 13 | 21 | −61.22 |
| 14 | 23 | 39.28 |
| 15 | 24 | −137.82 |
| 16 | 26 | 76.79 |
| 17 | 28 | 37.91 |
| 18 | 29 | −46.99 |

[Numerical Value Embodiment 2]

[unit: mm]

Surface data

| Surface number | r | d | nd | vd | Effective diameter |
|---|---|---|---|---|---|
| 1 | 155.647 | 21.59 | 1.48749 | 70.2 | 134.48 |
| 2* | −1114.571 | 139.48 | | | 133.04 |
| 3 | −161.207 | 2.84 | 1.85478 | 24.8 | 63.51 |
| 4(diffraction) | 127.094 | 11.14 | 1.43875 | 94.7 | 62.79 |
| 5 | −156.440 | 29.50 | | | 62.99 |
| 6 | 228.731 | 6.40 | 1.80810 | 22.8 | 59.19 |
| 7 | −289.712 | 34.69 | | | 58.66 |
| 8 | 228.801 | 4.36 | 1.80810 | 22.8 | 40.00 |
| 9 | −379.033 | 2.40 | 1.91082 | 35.3 | 38.94 |
| 10 | 73.684 | 37.82 | | | 37.21 |
| 11(stop) | ∞ | 5.00 | | | 31.66 |
| 12 | 55.564 | 1.58 | 1.95375 | 32.3 | 30.54 |
| 13 | 32.399 | 6.06 | 1.48749 | 70.2 | 29.48 |
| 14 | −207.155 | 3.88 | | | 29.16 |
| 15 | 154.516 | 4.01 | 1.85478 | 24.8 | 27.61 |
| 16 | −66.541 | 1.36 | 1.76385 | 48.5 | 27.12 |
| 17 | 69.812 | 3.00 | | | 25.98 |
| 18 | −106.915 | 1.29 | 1.76385 | 48.5 | 25.77 |
| 19 | 100.460 | 7.56 | | | 25.73 |
| 20 | 66.635 | 6.22 | 1.65412 | 39.7 | 27.37 |
| 21 | −54.067 | 1.30 | 1.59522 | 67.7 | 27.67 |
| 22 | −615.289 | 10.52 | | | 27.92 |
| 23 | −256.386 | 4.46 | 1.65412 | 39.7 | 29.04 |
| 24 | −38.652 | 1.38 | 1.43875 | 94.9 | 29.26 |
| 25 | −74.872 | 2.52 | | | 29.27 |
| 26 | −94.269 | 1.39 | 1.49700 | 81.5 | 28.79 |
| 27 | 44.161 | 0.42 | | | 28.75 |
| 28 | 50.666 | 7.24 | 1.65412 | 39.7 | 28.78 |
| 29 | −34.245 | 1.40 | 1.80810 | 22.8 | 28.71 |

-continued

[unit: mm]

| | | | | | |
|---|---|---|---|---|---|
| 30 | 784.994 | 62.87 | | | 28.93 |
| 31 | ∞ | 2.20 | 1.51633 | 64.1 | 50.00 |
| 32 | ∞ | 60.71 | | | 50.00 |
| Image plane | ∞ | | | | |

Aspheric surface data

2nd surface

K = 0.00000e+000
A4 = 2.09277e−008
A6 = −4.70861e−013
A8 = 1.93144e−017
A10 = −8.69953e−022

4th surface (diffraction surface)

C2 = −5.93393e−005
C4 = 3.90393e−010
C6 = 1.88978e−012
C8 = −6.92242e−016
C10 = −5.02508e−021

Various data

| | |
|---|---|
| Focal length | 780.00 |
| F-number | 5.80 |
| Half angle of view (deg) | 1.59 |
| Image height | 21.64 |
| Total lens length | 485.85 |
| BF | 125.03 |
| Entrance pupil position | 1446.52 |
| Exit pupil position | −54.97 |
| Front principal point position | −1153.47 |
| Rear principal point position | −654.97 |

Lens unit data

| Unit | Start surface | Focal length | Lens structure length | Front principal point position | Rear principal point position |
|---|---|---|---|---|---|
| 1 | 1 | 272.72 | 210.96 | 173.29 | −157.32 |
| 2 | 8 | −111.83 | 6.75 | 5.14 | 1.41 |
| 3 | 12 | 3012.50 | 65.60 | −45.25 | −94.69 |
| 1a | 1 | 281.73 | 21.59 | 1.79 | −12.80 |
| 1b | 3 | −182.79 | 13.99 | −3.89 | −13.49 |
| 1c | 6 | 159.05 | 6.40 | 1.57 | −1.99 |

Single lens data

| Lens | Start surface | Focal length |
|---|---|---|
| 1 | 1 | 281.73 |
| 2 | 3 | −82.76 |
| 3 | 4 | 158.78 |
| 4 | 6 | 159.05 |
| 5 | 8 | 177.13 |
| 6 | 9 | −67.56 |
| 7 | 12 | −84.28 |
| 8 | 13 | 57.95 |
| 9 | 15 | 54.87 |
| 10 | 16 | −44.41 |
| 11 | 18 | −67.62 |
| 12 | 20 | 46.58 |
| 13 | 21 | −99.67 |
| 14 | 23 | 69.02 |
| 15 | 24 | −184.26 |
| 16 | 26 | −60.31 |
| 17 | 28 | 32.33 |
| 18 | 29 | −40.58 |

[Numerical Value Embodiment 3]

[unit: mm]

Surface data

| Surface number | r | d | nd | vd | Effective diameter |
|---|---|---|---|---|---|
| 1 | 156.273 | 19.10 | 1.48749 | 70.2 | 134.48 |
| 2* | −24883.763 | 151.56 | | | 133.26 |
| 3 | 135.673 | 11.87 | 1.43875 | 94.7 | 63.34 |
| 4(diffraction) | −125.010 | 2.95 | 1.85478 | 24.8 | 61.36 |
| 5 | 132.968 | 20.35 | | | 59.01 |
| 6 | 140.658 | 5.93 | 1.80810 | 22.8 | 58.10 |
| 7 | −461.544 | 37.23 | | | 57.68 |
| 8 | −688.978 | 2.41 | 1.88300 | 40.8 | 38.71 |
| 9 | 125.930 | 40.18 | | | 37.75 |
| 10(stop) | ∞ | 5.00 | | | 31.12 |
| 11 | 61.430 | 1.51 | 1.95375 | 32.3 | 29.95 |
| 12 | 32.808 | 5.81 | 1.48749 | 70.2 | 28.95 |
| 13 | −110.302 | 1.15 | | | 28.74 |
| 14 | 187.739 | 3.10 | 1.85478 | 24.8 | 27.86 |
| 15 | −71.920 | 1.31 | 1.76385 | 48.5 | 27.55 |
| 16 | 68.565 | 3.05 | | | 26.43 |
| 17 | −113.322 | 1.26 | 1.76385 | 48.5 | 26.23 |
| 18 | 113.731 | 3.59 | | | 26.19 |
| 19 | 45.862 | 6.63 | 1.65412 | 39.7 | 26.94 |
| 20 | −142.991 | 1.26 | 1.59522 | 67.7 | 26.35 |
| 21 | 45.848 | 6.33 | | | 25.75 |
| 22 | 117.974 | 7.03 | 1.65412 | 39.7 | 27.16 |
| 23 | −36.165 | 1.36 | 1.43875 | 94.9 | 27.63 |
| 24 | −88.833 | 4.25 | | | 27.73 |
| 25 | −71.971 | 1.36 | 1.49700 | 81.5 | 27.36 |
| 26 | 61.745 | 0.11 | | | 27.65 |
| 27 | 62.183 | 7.70 | 1.65412 | 39.7 | 27.68 |
| 28 | −37.559 | 1.38 | 1.80810 | 22.8 | 27.74 |
| 29 | −638.763 | 68.94 | | | 28.07 |
| 30 | ∞ | 2.20 | 1.51633 | 64.1 | 50.00 |
| 31 | ∞ | 60.71 | | | 50.00 |
| Image plane | ∞ | | | | |

Aspheric surface data

2nd surface

K = 0.00000e+000
A4 = 1.06987e−008
A6 = −1.34605e−013
A8 = 5.73865e−018
A10 = −3.16749e−022

4th surface (diffraction surface)

C2 = −6.27977e−005
C4 = 2.74753e−009
C6 = −1.32756e−012
C8 = 5.75052e−016
C10 = −2.69884e−019

Various data

| | |
|---|---|
| Focal length | 780.00 |
| F-number | 5.80 |
| Half angle of view (deg) | 1.59 |
| Image height | 21.64 |
| Total lens length | 485.85 |
| BF | 131.10 |
| Entrance pupil position | 1464.99 |
| Exit pupil position | −48.92 |
| Front principal point position | −1134.88 |
| Rear principal point position | −648.91 |

-continued

[unit: mm]

Lens unit data

| Unit | Start surface | Focal length | Lens structure length | Front principal point position | Rear principal point position |
|---|---|---|---|---|---|
| 1 | 1 | 273.02 | 211.77 | 136.38 | −157.92 |
| 2 | 8 | −120.41 | 2.41 | 1.08 | −0.20 |
| 3 | 11 | −8404.54 | 58.16 | −119.87 | −165.38 |
| 1a | 1 | 318.65 | 19.10 | 0.08 | −12.77 |
| 1b | 3 | −162.90 | 14.82 | 14.65 | 4.38 |
| 1c | 6 | 133.40 | 5.93 | 0.77 | −2.53 |

Single lens data

| Lens | Start surface | Focal length |
|---|---|---|
| 1 | 1 | 318.65 |
| 2 | 3 | 150.38 |
| 3 | 4 | −75.71 |
| 4 | 6 | 134.00 |
| 5 | 8 | −120.41 |
| 6 | 11 | −75.78 |
| 7 | 12 | 52.57 |
| 8 | 14 | 61.17 |
| 9 | 15 | −45.77 |
| 10 | 17 | −74.13 |
| 11 | 19 | 53.83 |
| 12 | 20 | −58.18 |
| 13 | 22 | 43.09 |
| 14 | 23 | −140.12 |
| 15 | 25 | −66.64 |
| 16 | 27 | 36.92 |
| 17 | 28 | −49.43 |

TABLE 1

| | Conditional Expression | | | | | | | | | |
|---|---|---|---|---|---|---|---|---|---|---|
| | (1) | (2) | (3) | (4) | (5) | (6) | (7) | (8) | (9) | (10) |
| Embodiment 1 | −0.216 | 0.476 | 0.150 | 0.264 | 12.28 | 20.51 | 10.377 | 0.403 | 0.176 | −0.034 |
| Embodiment 2 | −0.234 | 0.495 | 0.161 | 0.218 | 12.28 | 19.50 | 10.803 | 0.361 | 0.204 | 0.118 |
| Embodiment 3 | −0.209 | 0.476 | 0.125 | 0.278 | 12.31 | 20.15 | 10.208 | 0.409 | 0.172 | −0.031 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-225810, filed Nov. 21, 2016, and Japanese Patent Application No. 2017-196646, filed Oct. 10, 2017, which are hereby incorporated by reference herein in their entirety.

What is claimed is:

1. An image pickup optical system comprising, in order from an object side to an image side:
   a first lens unit having a positive refractive power,
   a second lens unit having a negative refractive power,
   an aperture stop, and
   a third lens unit,
   wherein the second lens unit moves during focusing,
   wherein the first lens unit consists of, in order from the object side to the image side,
   a first lens sub-unit having a positive refractive power,
   a second lens sub-unit having a negative refractive power, and
   a third lens sub-unit having a positive refractive power,
   wherein the first, second, and third lens sub-units are arranged such that adjacent lens sub-units are spaced from each other, and
   wherein the following conditional expression is satisfied:

$$-0.65 < f1b/f < -0.05$$

where $f1b$ is a focal length of the second lens sub-unit, and $f$ is a focal length of the image pickup optical system.

2. The image pickup optical system according to claim 1, wherein the following conditional expression is satisfied:

$$0.43 < d1a/f1a < 0.80$$

where $d1a$ is a distance between the first lens sub-unit and the second lens sub-unit, and $f1a$ is a focal length of the first lens sub-unit.

3. The image pickup optical system according to claim 1, wherein the following conditional expression is satisfied:

$$0.07 < d1b/|f1b| < 0.35$$

where $d1b$ is a distance between the second lens sub-unit and the third lens sub-unit, and $f1b$ is the focal length of the second lens sub-unit.

4. The image pickup optical system according to claim 1, wherein the second lens sub-unit has a diffraction surface for diffracting incident light.

5. The image pickup optical system according to claim 1, wherein an image-side surface of the first lens sub-unit has an aspheric shape.

6. The image pickup optical system according to claim 1, wherein the second lens sub-unit is a cemented lens of a positive lens and a negative lens cemented to each other.

7. The image pickup optical system according to claim 6, wherein the negative lens is biconcave.

8. The image pickup optical system according to claim 7, wherein the following conditional expression is satisfied:

$$-0.20 < (ra+rb)/(ra-rb) < 0.20$$

where $ra$ is a curvature radius of an object-side surface of the negative lens, and $rb$ is a curvature radius of an image-side surface of the negative lens.

9. The image pickup optical system according to claim 1, wherein the second lens unit moves to the image side during focusing from infinity to a close distance.

10. The image pickup optical system according to claim 1, wherein the following conditional expression is satisfied:

$$0.12 < d1c/f1c < 0.45$$

where $d1c$ is a distance between the third lens sub-unit and the second lens unit when the image pickup optical system is focused at infinity, and $f1c$ is a focal length of the third lens sub-unit.

11. The image pickup optical system according to claim 1, wherein the following conditional expression is satisfied:

$$10.4 < f/ea1b < 16.0$$

where ea1b is an effective diameter of a lens surface closest to the object side in the second lens sub-unit.

12. The image pickup optical system according to claim 1, wherein the following conditional expression is satisfied:

$$17.0 < f/ea2 < 24.0$$

where ea2 is an effective diameter of a lens surface closest to the object side in the second lens unit.

13. The image pickup optical system according to claim 1, wherein the second lens sub-unit has a diffraction surface for diffracting incident light, and
wherein the following conditional expression is satisfied:

$$5.0 < fC2/f < 16.5$$

where fC2 is a focal length of the diffraction surface for first-order diffraction light.

14. The image pickup optical system according to claim 1, wherein the following conditional expression is satisfied:

$$0.20 < f1a/f < 0.60$$

where f1a is a focal length of the first lens sub-unit.

15. The image pickup optical system according to claim 1, wherein the following conditional expression is satisfied:

$$0.10 < f1c/f < 0.30$$

where f1c is a focal length of the third lens sub-unit.

16. An image pickup apparatus comprising:
the image pickup optical system according to claim 1; and
an image pickup element that receives light of an image formed by the image pickup optical system.

* * * * *